United States Patent

Kanazawa et al.

[11] Patent Number: 4,805,939
[45] Date of Patent: Feb. 21, 1989

[54] VEHICLE STEERING SYSTEM

[75] Inventors: Hirotaka Kanazawa; Shunsuke Kawasaki; Shigeki Furutani; Akihiko Miyoshi, all of Hiroshima, Japan

[73] Assignee: Mazda Motor Corporation, Hiroshima, Japan

[21] Appl. No.: 68,723

[22] Filed: Jun. 30, 1987

Related U.S. Application Data

[63] Continuation-in-part of Ser. No. 885,781, Jul. 15, 1986, abandoned.

[30] Foreign Application Priority Data

Jul. 18, 1985 [JP] Japan .................. 60-156935

[51] Int. Cl.4 .................................. B62D 6/02
[52] U.S. Cl. ........................ 280/91; 180/140
[58] Field of Search ............... 280/91; 180/132, 140, 180/141, 143

[56] References Cited

U.S. PATENT DOCUMENTS

| 4,313,514 | 2/1982 | Furukawa et al. | 180/143 |
| 4,572,316 | 2/1986 | Kanazawa et al. | 280/91 |
| 4,700,960 | 10/1987 | Miki et al. | 180/140 |
| 4,706,771 | 11/1987 | Kawabe et al. | 180/140 |

FOREIGN PATENT DOCUMENTS

| 0205560 | 9/1986 | Japan | 180/140 |
| 2154523 | 9/1985 | United Kingdom | 280/91 |

Primary Examiner—David M. Mitchell
Assistant Examiner—Karin L. Ferriter
Attorney, Agent, or Firm—Fleit, Jacobson, Cohn & Price

[57] ABSTRACT

A steering mechanism of a vehicle including a front wheel steering mechanism for steering front wheels of the vehicle, a steering wheel wheel for effecting a steering movement of the front wheel steering mechanism to a desired angle, a rear wheel steering mechanism for steering rear wheels of the vehicle, a control unit for effecting a steering movement of the rear wheel steering mechanism in relation with the steering movement of the front wheels. The arrangement is such that a ratio of the steering angle of the rear wheel to the steering angle of the front wheel is increased in the same direction of steering as the steered direction of the front wheels as the rate of the steering operation for the steering wheel is increased so as to obtain a desirable steering movement of the rear wheels.

5 Claims, 8 Drawing Sheets

VEHICLE STEERING SYSTEM

This application is a continuation-in-part of application Ser. No. 885,781, filed July 15, 1986, now abandoned.

BACKGROUND OF THE INVENTION

The present invention relates to a vehicle steering system and more particularly to a so-called four-wheel steering system wherein fore and aft wheels are steered simultaneously. More specfically, the present invention pertains to control means for controlling the steering angle of the rear wheels in relation to the steering angle of the front wheels.

DESCRIPTION OF THE PRIOR ART

It has already been proposed in four-wheeled vehicles to steer not only the front wheels but also the rear wheels for the purpose of obtaining an improved steering properties. For example, in the U.S. Pat. No. 4,313,514 discloses a vehicle steering system including a front wheel steering mechanism for steering the front wheels and a rear wheel steering mechanism for steering the rear wheels wherein the rear wheel steering mechanism controls the steering ratio of the rear wheels to the front wheels in accordance with the vehicle speed. In the steering system, the rear wheel is steered in the opposite direction as the front wheel under a low speed vehicle operation and in the same direction under a high speed operation so as to facilitate the turning movement of the vehicle. It is alleged that with this control it is possible to minimize the turning radius of the vehicle to thereby improve the maneuvability of the vehicle.

It should however be noted that in general, the turning rate of the vehicle under a steering operation is dependent not only on the steering angle but also on the steering rate or the angular speed under which the steering wheel is moved. More specifically, there is a general tendency that the turning rate of the vehicle is increased as the steering rate is increased even when the steering angle is the same. It will therefore be understood that under a high steering rate, there is a tendency of oversteer and this tendency cannot be suppressed even with the control as proposed by the aforementioned U.S. Patent.

SUMMARY OF THE INVENTION

It is therefore an object of the present invention to provide a vehicle steering mechanism wherein the rear wheels are steered in relation to the steering movement of the front wheel in such a manner that substantially the same and turning movement of the vehicle can be produced under a givn steering angle irrespective of the steering rate.

Another object of the present invention is to provide a vehicle steering mechanism wherein the vehicle turning rate is determined irrespective of the steering rate, that is, the angular rate under which the steering wheel is steered.

Another object of the present invention is to provide a vehicle steering mechanism by which a stable drivability can be obtained in the four-wheeled vehicles.

According to the present invention, the above and other objects can be accomplished by a steering mechanism of a vehicle including front wheel steering means for steering front wheels of the vehicle, operating means for effecting a steering movement of said front wheel steering means to a desired angle, rear wheel steering means for steering rear wheels of said vehicle, steering angle control means for effecting a steering movement of said rear wheel steering means in relation to the steering movement of the front wheels, said steering angle control means including actuating means for moving said rear wheels to a desired steering angle of the rear wheels, characterized by the fact that the vehicle further comprises steering rate detecting means for detecting a rate of the steering operation for said operating means and producing signals denoting the rate of the steering operation, and steering ratio changing means for changing a steering angle of the rear wheels based on the signals from the steering rate detecting means in such a manner that a steering angle ratio of said rear wheels to the steered angle of said front wheel is increased in the same direction as the steered direction of the front wheels as the rate of the steering operation increases.

According to the features of the present invention, when an operating action is applied to the operating means in order to produce same steering angle of the front wheels, a substantially same propeties of the turning movement of the vehicle can be obtained irrespective of the changes of the operating rate for the operating means to thereby maintain the stable drivability of the vehicle.

The above and other objects and features of the present invention will become apparent from the following description of preferred embodiments taking reference to the accompanying drawings.

DESCRIPTION OF THE PREFERRED EMBODIMENTS

Figure 1:
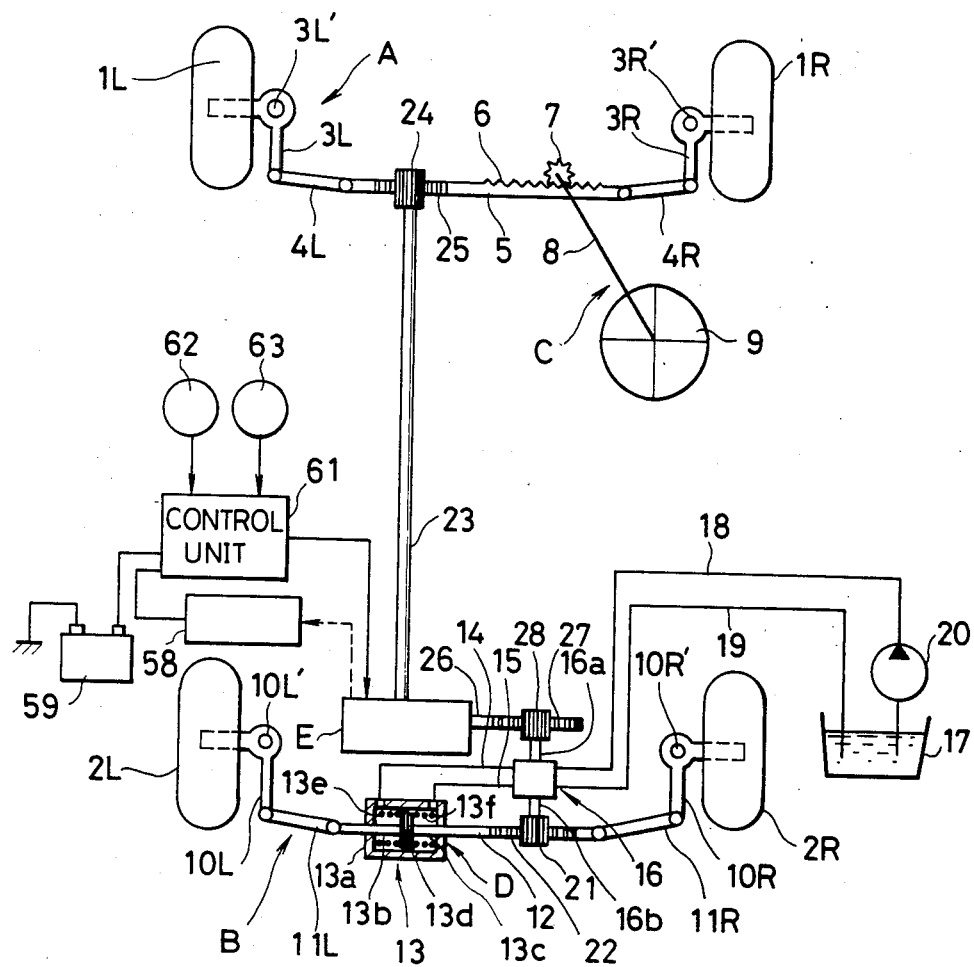
FIG. 1 is a diagrammatical illustration of a vehicle steering system in accordance with one embodiment of the present invention.

Referring to the drawings, particularly to FIG. 1, there is shown a vehicle steering system including a front wheel steering mechanism A which is adapted to steer a pair of front wheels 1R and 1L. The front wheel steering mechanism A is connected with an operating mechanism C including a steering wheel 9 and a rack-and-pinion mechanism which functions to convert a rotating movement of the steering wheel 9 into a linear movement. The rack and pinion mechanism is provided with rack 6 formed on the rod 5, and a pinion 7 in meshing engagement with the rack 6 in which the pinion 7 is connected to the steering wheel 9 through a shaft 8. The front wheel steering mechanism A further includes knuckle arms 3R, 3L and tie-rods 4R, 4L interconnected by means of a rod 5 which transmit the linear movement of the rack-and-pinion mechanism to the front wheels 1R and 1L. Thus, when the steering wheel 9 is operated in the right direction in the FIG. 1, the rod 5 moves in the left direction in the FIG. 1 so that the knuckle arms 3R, 3L and therefore the front wheels 1R and 1L are steered in the clockwise direction around rotating centers 3R' and 3L' in response to the amount of the operation of the steering wheel 9, that is, the steering angle. When the steering wheel 9 is operated in the left, the front wheels 1R and 1L are similarly steered leftward.

There is further provided a rear wheel steering mechanism B which is adapted to steer a pair of rear wheels 2R and 2L. The steering mechanism B also includes a pair of knuckle arms 10R and 10L, tie-rods 11R and 11L, and a rod 12 for interconnecting the tie-rods 11R and 11L. The illustrated rear wheel steering mechanism B is further provided with a hydraulic power assist system D for obtaining a desirable movement of the rear steering mechanism B. The power assist system D is provided with a power cylinder 13 mounted on the rod 12. It will be noted that in FIG. 1, the rod 11 is axially passed through the cylinder 13. In the cylinder 13, there is a piston 13d which is secured to the rod 11 and slidable in the cylinder 13 in the axial direction. The piston 13d divides the inside cavity of the cylinder 13 into a left chamber 13b and a right chamber 13c. The chambers 13b and 13c are communicated with a control valve 16 through oil passages 14 and 15 respectively. The control valve 16 is connected to oil passages 18 and 19 extending from a reservoir 17. The oil passage 18 is connected to a oil pump 20 (not shown) for supplying a hydraulic pressure. The control valve 16 is provided with an input shaft 16a which functions as an input member of the power system D, and an output shaft 16b. The output shaft 16b is formed with a pinion 21 in meshing engagement with a rack 22 formed on the rod 12. In the rear wheel steering mechanism, when the input shaft 16a and therefore the pinion 21 rotates to move the rod 12 rightward, the knuckle arms 10R and 10L pivot around the axes 10R' and 10L' in the clockwise direction so that the rear wheels 2R and 2L are steered rightward. In this case, an hydraulic pressure is introduced into the chamber 13b of the cylinder 13 in accordance with the amount of the rotation of the shaft 16a to assist to drive the rod 12. Similarly, when the shaft 16a is rotated in the opposite direction, the hydraulic pressure is introduced into the chamber 13c so that the rear wheels 2R and 2L are steered leftward.

In FIG. 1, there are disposed springs 13e, 13f for urging the rod to a neutral position in the cylinder 13.

The operating mechanism C is connected with the rear wheel steering mechanism B through the front wheel steering system A and a steering ratio changing device E. An intermediate rod 23 provided with a pinion 24 at the front end thereof extends forwardly from the steering ratio changing device E. The pinion 24 is brought into meshing engagement with the rack 25 formed on the rod 5 of the front steering system A. A moving rod 26 extending from the steering ratio changing device E is formed with a rack 27 in meshing engagement with a pinion 28 mounted on the input shaft 16a of the control valve 16.

Figure 2:
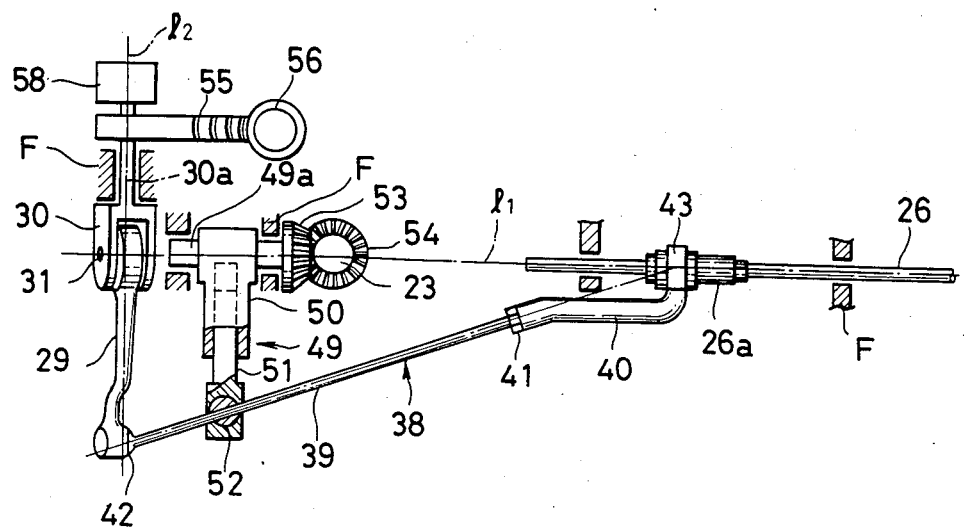
FIG. 2 is a partly schematic view of a rear steering mechanism.

Referring now to FIG. 2, the above moving rod 26 of the steering ratio changing device E is slidably mounted on a vehicle body F along a line $l_1$. The steering ratio changing device E is provided with a swingable arm 29 which is swingably mounted on a holder 30 at the base portion thereof by means of a pin 31. The holder 30 is rotatably mounted on the body F so as to rotate around a rotating axis 30a thereof in line with a line $l_z$ perpendicular to the line $l_1$. The pin 31 is located at a point where the line $l_1$ intersects the line $l_z$ and extends in a direction at the right angle to the line $l_z$.

Figure 3:
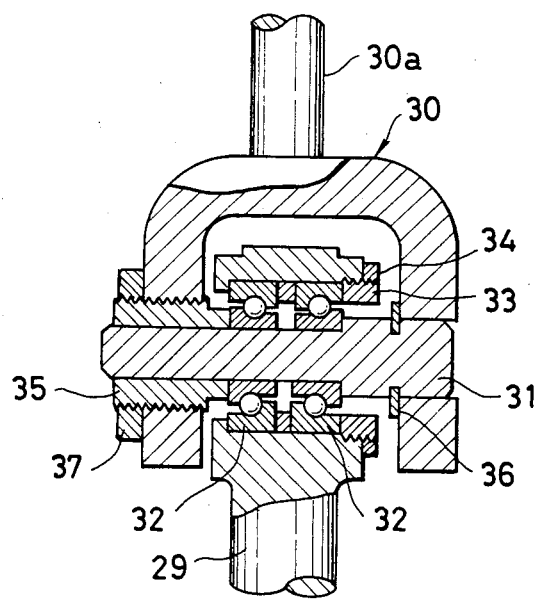
FIG. 3 is a partially sectional view of a holder of the rear steering mechanism.

Referring to FIG. 3, there is shown a connected portion of the holder 30 and the swingable arm 29 wherein the pin 31 is disposed within a U-shaped portion of the holder 30. The base portion of the arm 29 is rotatably engaged with the pin 31 through a pair of angular bearings 32. A guide member 33 and lock nut 34 are provided for securing the arm 29 to the bearing 32 and the pin 31. There are further provided a guide member 35, a washer 36 and a lock nut 37 for securing the pin 31 to the holder 30. Thus, the arm 29 is swingable around the pin 31. It should however be noted that an angle between the pin 31 and the line $l_1$, that is, between the pin 31 and a surface perpendicular to the line $l_1$ can be changed by rotating the holder 30.

Figure 4:
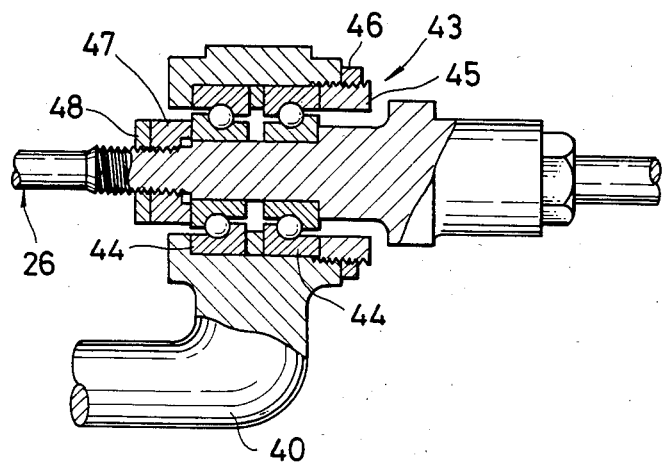
FIG. 4 is a partially sectional view of an angular bearing of the rear wheel steering mechanism.

The swingable arm 29 is connected to the moving rod 26 at the tipend portion through a connecting member 38. The connecting member 38 including a rod 39 and an arm 40 is of a sufficient stiffness. The rod 39 is brought into meshing engagement with the arm 40 through a lock nut 41 so that the connecting member 38 is arranged for a desirable length. The connecting member 38 is connected to the swingable arm 29 at the front end of the rod 39 through a ball joint 42 and rotatably connected to the moving member 26 at the rear end portion of the arm 40 through a rotatable joint 43. Referring to FIG. 4, in the rotatable joint 42, the arm 40 is rotatably connected to the moving member 26 through a pair of angular bearings 44. A guide member 45 and a lock nut 46 are provided for securing the arm 40 to the angular bearings 44. In the arrangement, it should be noted that though the arm 40 is of a arcuate member so as to avoid the interference with the moving member 26, the rotatable joint 43, that is, a joint portion between the moving member 26 and the arm 40 is positioned on the extension line of the axis of the straight rod 39.

Thus, the distance between the ball joint 42 located at the tip end of the swingable arm 29 and the rotatable joint 43 is maintained at a constant value by means of the connecting member 38. It is therefore understood that the moving member 26 is moved in the lateral direction in the FIG. 2 in accordance with the movement of the ball joint 42 in the lateral direction.

The swingable arm 29 is adapted to swing around the pin 31 in response to the steering movement of the operating mechanism C that is, the steering angle produced in the steering wheel 9. For this purpose, an actuating arm 49 is provided for the rod 39 of the connecting member 38. The actuating arm 49 including a main body 50 and a tip member 51 is rotatably mounted to the vehicle body F in such a manner that a rotation shaft 49a of the base portion of the main body 50 is positioned on the axis line $l_1$. The tip member 51 is slidably engaged with the main body 50 in a direction perpendicular to the rotation shaft 49a and engaged at the tip end portion with the rod 39 of the connecting member 38 through a ball joint 52. A bevel gear 53 provided on the rotation shaft 49a of the actuating arm 49 is in meshing engagement with a bevel gear 54 mounted on the rear end of the intermediate rod 23. It will be understood that the ball joint 42 is moved along the line $l_1$ in the FIG. 2 in accordance with the swingable movement of the arm 29 around the pin 31 in response to the amount of the steering movement of the steering wheel 9 since the axis of the pin 31 is inclined to the line $l_1$ so that the moving member 26 is moved through the connecting member 38. It will be therefore noted that the amount of the lateral movement of the ball joint 42 is changed in accordance with the changes in the rotative angle of the holder 30, that is, the angle between the axis of the pin 31 and the line $l_1$ even when the swing angle of the arm 29 is constant.

Figure 5:
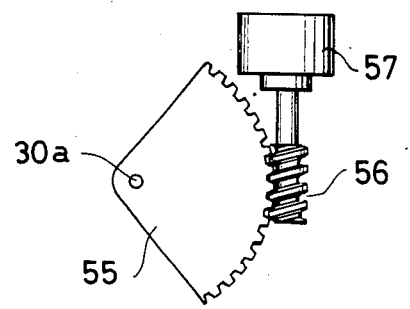
FIG. 5 is a partial diagrammatical view of the rear wheel steering mechanism.

As shown in FIG. 5, in order to control the angle beteen the axis of the pin 31 and the line $l_1$, there is provided a sector gear 55 on the rotative shaft 30 of the holder 30. The sector gear is brought into meshing engagement with a worm gear 56 which is driven by an actuator including a solenoid, a pulse motor and the like. The rotative angle of the holder 30, that is, the angle of the axis of the pin 31 to the line $l_1$ is detected by means of a steering angle ratio detector 58 (shown in the FIG. 1). As shown in FIG. 1, there is provided a battery 59.

Figure 6:
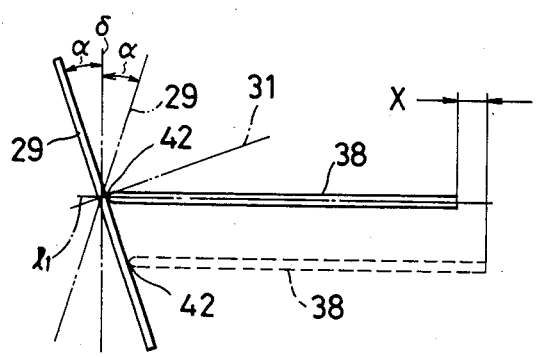
FIG. 6 is a schematic view of the rear wheel steering mechanism.
Figure 7:
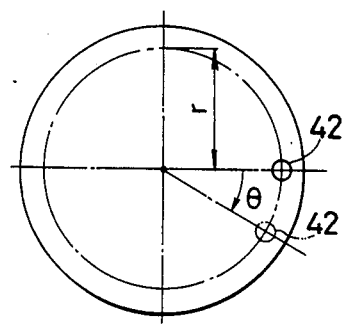
FIG. 7 is a diagrammatical view showing the movement of the holder of the rear wheel steering mechanism.
Figure 8:
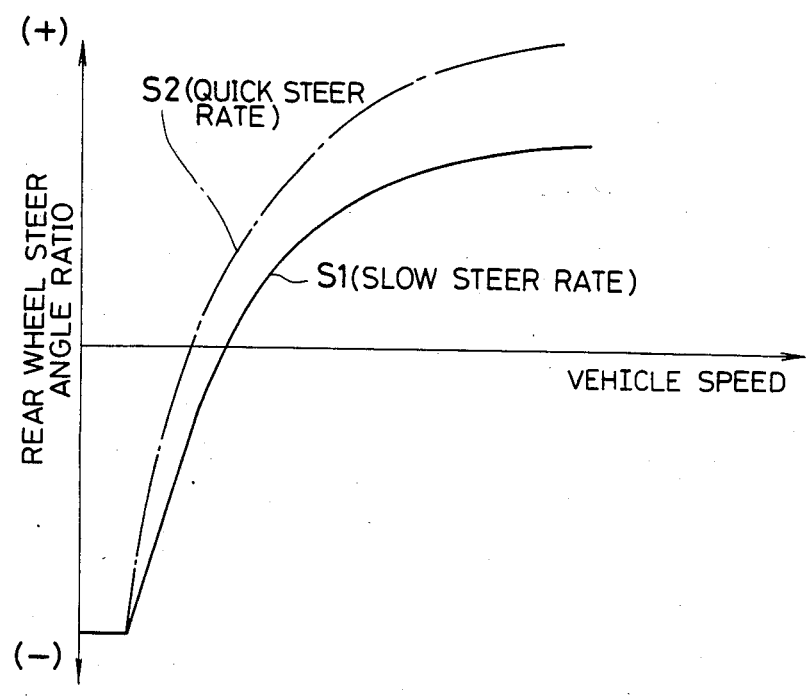
FIG. 8 is a diagram showing one example of the steering angle ratio of the rear wheel in relation to the steering of the front wheel.

Now referring to FIG. 6, and FIG. 7, there is shown a schematic view of the relationship between the angle of the axis of the pin 31 to the line $l_1$ and the amount of the movement of the ball joint 42 in the lateral direction. In the FIG. 6 and FIG. 7, the swing angle of the arm 29 around the pin 31 is denoted by $\Theta$. Similarly, a plane perpendicular to the line $l_1$, the angle between the plane and the plane of the swing orbit of the arm and the distance between the pin 31 and the ball joint 42 are denoted by $\delta$, $\alpha$, and $r$ respectively. The amount of the movement X of the ball joint 42 is denoted by a formula $X = r \cdot \tan \alpha \cdot \sin \Theta$ which is a funtion of $\alpha$, and $\Theta$. It will be therefore understood that the movement X of the ball joint 42 is a function of the angle $\Theta$ that is, the steering angle when the angle $\alpha$ is constant while the amount X is changed under the constant steering angle when the angle $\alpha$ is changed. This means that the change of the angle $\alpha$ changes the steering angle ratio. For example, the steering angle ratio can be controlled by means of a control of the angle $\alpha$ as shown in FIG. 8. In the illustrated embodiment as shown in the FIG. 8, the steering angle ratio is changed in accordance with the vehicle speed. The real line S1 denotes a property of the steering angle ratio in which the rate of the steering operation as produced in an usual operation is relatively low. On the other hand, the dotted line S2 denotes a property of the steering angle ratio in which the rate of the steering operation is high.

According to the above steering angle ratio control, the rear wheels 2R and 2L are steered in the direction opposite to the direction as the front wheels is steered under low vehicle speed operation such as garaging so that the vehicle can be smoothly led to the garage. While, the rear wheels 2R and 2L are steered in the same direction as the direction of the front wheels 1R and 1L under high vehicle speed operation such as running in the express highway so that the running zone of the vehicle can be quickly changed. The property S2 is determined in such a manner that it takes larger positive values in comparison with the property S1 as the rate of the steering operation for the steering wheel 9 is increased.

Figure 8A:
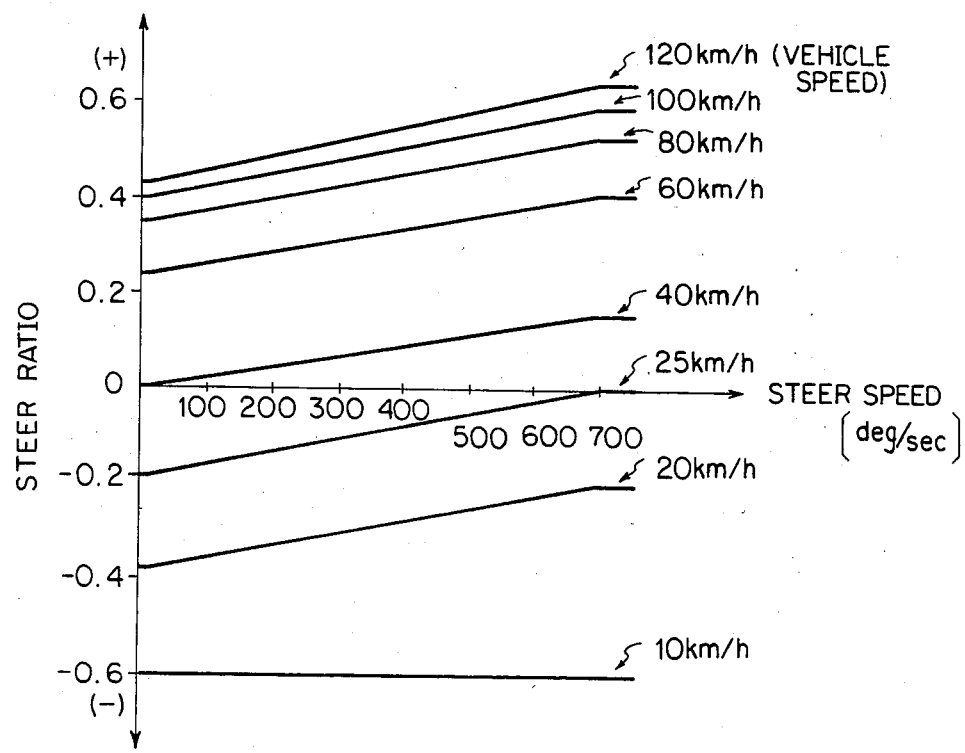
FIG. 8A is a diagram showing the relationship between the steering ratio of the rear wheels to the front wheels and the storing rate.

There is shown in FIG. 8A the relationship between the steering ratio of the rear wheels to the front wheels and the steering rate or steering operation speed for the steering wheel by the driver under various vehicle speeds.

According to FIG. 8A, the steering ratio changes in a manner of increasing the values as the steering rate is increased. The steering ratio also is increased as the vehicle speed is increased. In FIG. 8A, the positive sign indicates that the rear wheels are steered in the same direction as the front wheels are steered. On the other hand, in a zone of the negative sign, the rear wheels are steered in the opposite direction to the steered direction of the front wheels. The steer speed or steering rate is expressed in FIG. 8A as degrees per second. The break between the usual operation which is relatively low (S1) and a high rate of steering operation (S2) is about 700 degrees per second.

There is further provided an electronic control unit 61 which controls the steering angle of the rear wheels 2R and 2L based onthe property S1 and S2. The control unit 61 receives signals from the steering angle ratio detector 58, signals from a vehicle speed sensor 62 and signals from a steering rate sensor 63 for detecting the rate of the steering operation for the steering wheel 9. The control unit 61 produces signals for the actuator 57. It will be noted that the rate of the steering operation for the steering wheel 9 may be obtained by detecting the rotation speed of the steering wheel 9, the moving speed of the rod 5 or the like.

Figure 10:
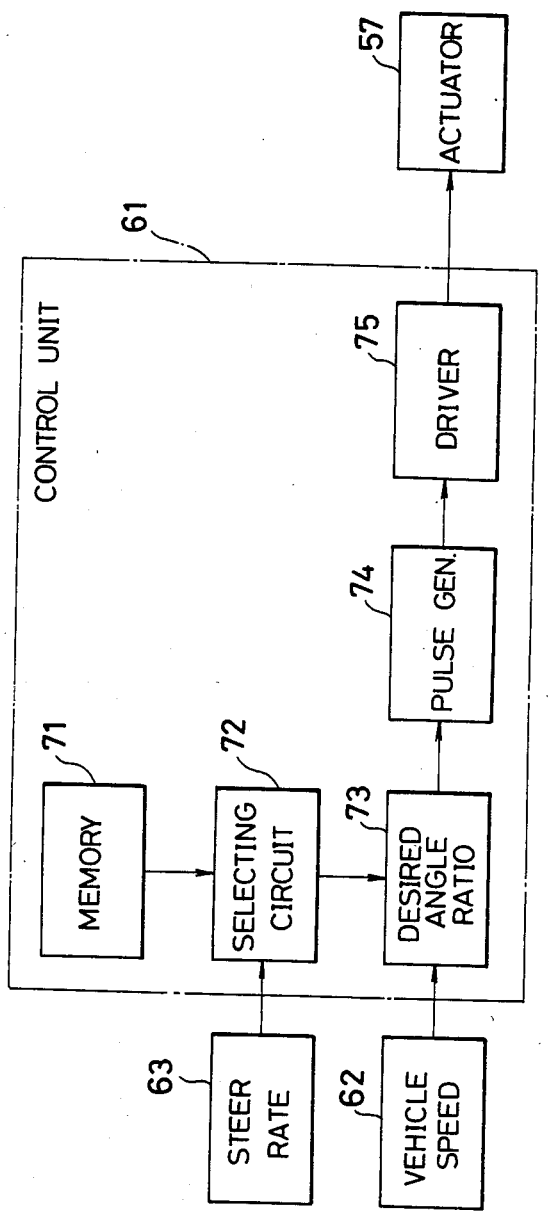
FIG. 10 is a block diagram showing one example of the control system which can be used in the steering system shown in FIG. 1.

Referring now to FIG. 10, it will be noted the control unit 61 includes a desired steering angle calculating circuit 73 which receives the signals from the sensor 62 and a selecting circuit 72 which receives signals from the steering rate sensor 63 so as to determine desirable steering angle ratio property among the properties as shown in the FIG. 8 in accordance with the rate of the steering operation. The calculating circuit 73 is connected with a memory 71 which memorizes steering angle ratio properties S1 and S2 between the steering angle of the rear wheels 2R and 2L and steering angle of the front wheels 1R and 1L. The output of the calculating circuit 73 is connected with a pulse generator 74 which produces pulse signals corresponding to the output of the calculating circuit 73. The output of the pulse generator 74 is connected with a motor driving circuit 75 which produces signals for actuating the actuator 57.

In operation, the selecting circuit 72 of the control unit 61 determines a desired steering angle ratio properties of the rear wheels among the properties memorized in the memory 71 based on the steered rate signal from the sensor 63. The calculating circuit 73 then calculates a desirable steering angle ratio of the rear wheels 2R and 2L to the front wheels 1R and 1L based on the steering angle ratio property selected by the selecting circuit 72 in accordance with the vehicle speed. The signals from the calculating circuit 73 are applied to the pulse generator 74, to the driving circuit 75, in turn to the actuator 57 as a pulse motor so that the actuator 57 is driven to provide a desirable steering angle of the rear wheels 2R and 2L. It should be noted that a feedback control may be adopted making use of the steering angle ratio detector 58 in order to reduce the amount of an error between the steering angle based on the above calculated steering angle ratio.

Thus, the rear wheels 2R and 2L are steered in accordance with the property S1 under slow steering operation for the steering wheel 9, while in accordance with the property S2 under quick steering operation.

Figure 11:
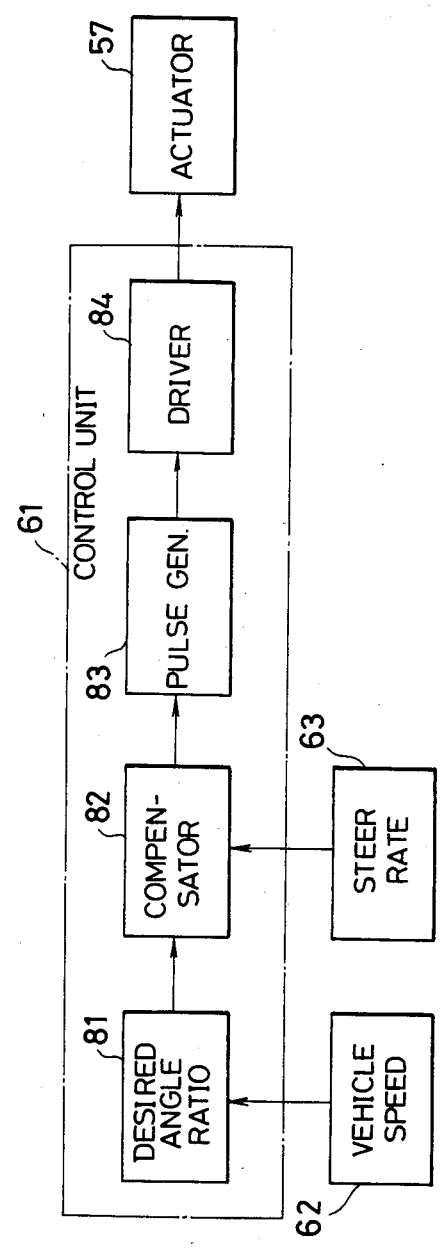
FIG. 11 is a block diagram showing another example of the control system which can be used in the steering system shown in FIG. 1; and, FIG. 12 is a diagrammatical view of a steering system similar to FIG. 1 but showing another embodiment.

FIG. 11 shows another embodiment of the control unit 61. This control unit 61 is provided with a calculating circuit 81 which receives signals from the vehicle speed sensor 62. The calculating circuit 81 calculates a desirable steering angle ratio of the rear wheels 2R and 2L to the front wheels 1R and 1L based on the property S1. When the rate of the steering operation for the steering wheel 9 is high, the value of the steering angle ratio calculated in the calculating circuit 81 is then compensated based on the property S2 by means of a compensating circuit 82 which receives the signals from the steering rate sensor 63. The actuator 57 is driven in accordance with the output of the compensating circuit 82 through a pulse generator 83 and a driving circuit 84 to thereby cause the steering movement of the rear wheels 2R and 2L.

Figure 9:
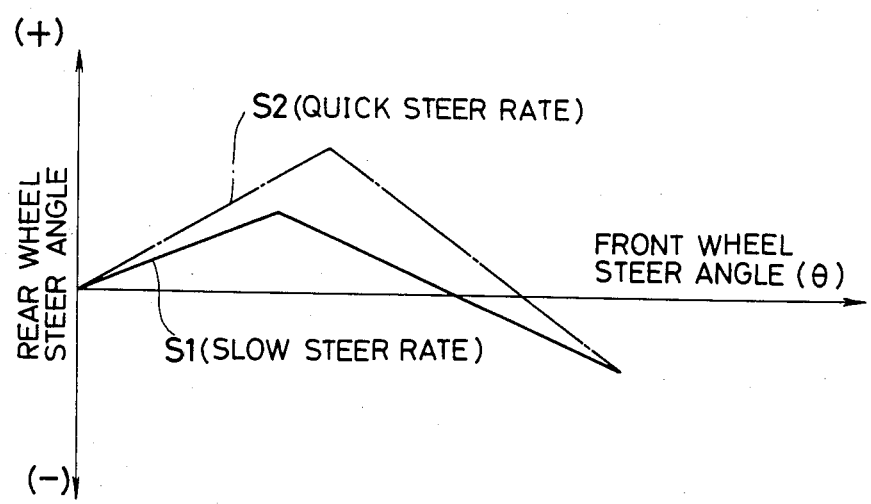
FIG. 9 is a diagram showing one example of the steering angle of the rear wheel in relation to the steering of the front wheel.

FIG. 9 shows steering angle ratio properties wherein the steering angle of the rear wheels 2R and 2L is determined based on the steering angle of the front wheels 1R and 1L instead of the vehicle speed described in reference to the FIG. 8. In the FIG. 9, the property S2 corresponding to the quick steering operation for the steering wheel 9 takes larger positive values in comparison with the property S1 corresponding to the slow steering operation. In order to control the steering angle of the rear wheels 2R and 2L in accordance with the properties as shown in the FIG. 9, a sensor may be utilized for detecting the steering angle of the front wheels in lieu of the vehicle speed sensor as shown in the FIG. 10 and FIG. 11. It will be understood that the steering angle of the front wheels can be obtained by detecting the amount of the rotation angle of the steering wheel 9 or the movement of the rod 5.

Figure 12:
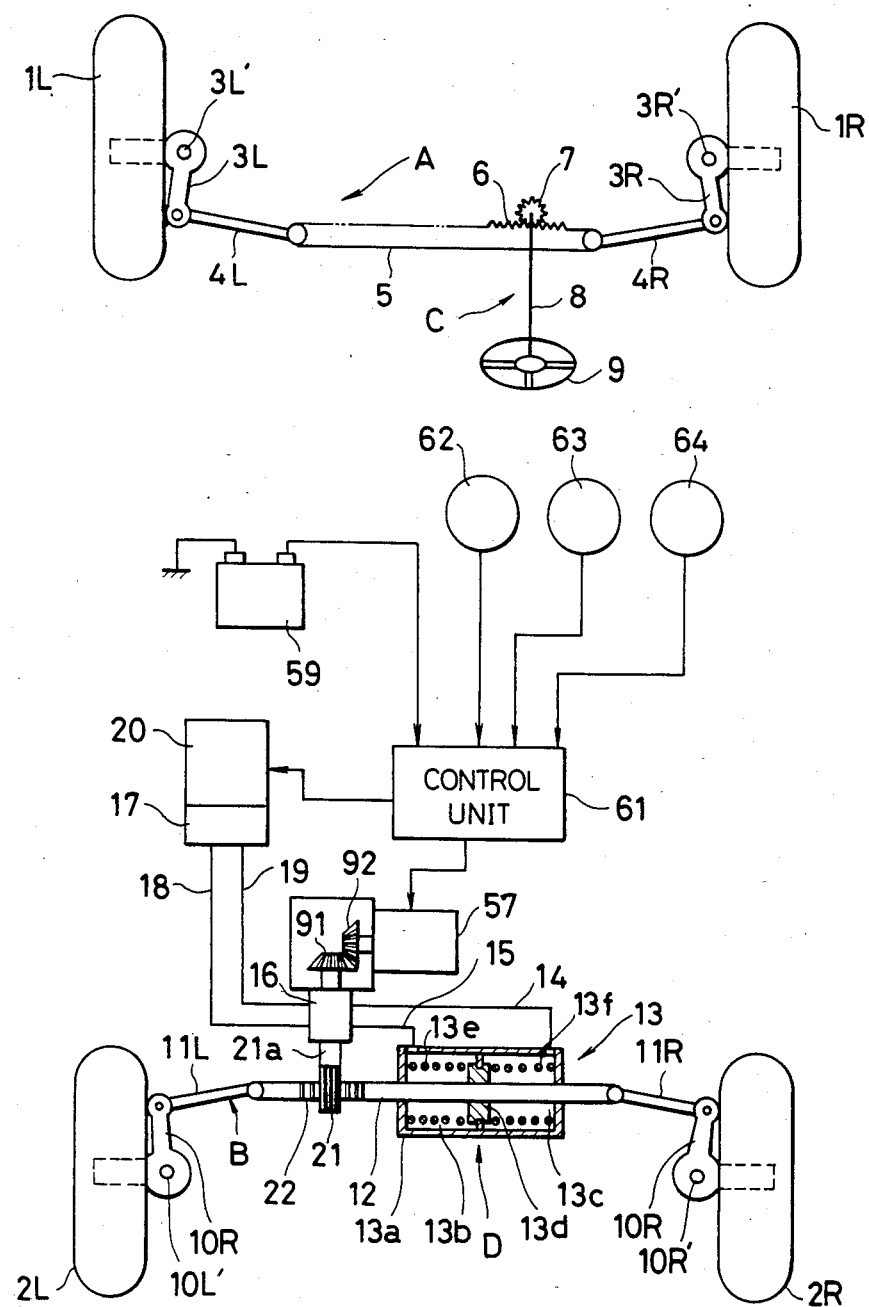

Referring now to FIG. 12, there is shown another embodiment of the four-wheeled vehicle in accordance with the present invention.

In the illustrated system, the front wheel steering mechanism A ( the operating mechanism C) is connected with the rear wheel steering mechanism B by not mechanical means but electrical means unlike the aforementioned embodiment. The pinion 21 is brought in meshing engagement with the rack 22 formed on the rod 12 as well as in the embodiment of the FIG. 1. The pinion is however driven by the actuator 57 of a pulse motor through a pair of bevel gears 91, 92. The actuator 57 is adapted to be controlled by the control unit 61. The control unit receives signals from the steering rate sensor 63, the steering angle sensor 64 for the front wheels and, if desired, (in the case where the rear wheel steering angle is controlled in accordance with the properties as shown in the FIG. 8 ) the vehicle speed sensor 64. A drive shaft 21a of the pinion 21 which corresponds to the input shaft 16a and output shaft 16b in the FIG. 1 is connected to the control valve for the power assist system D. The hydraulic pump 20 is driven by electrical signals from the control unit 61 when the actuator 57 is actuated.

In the above mentioned four-wheeled system, when the steering rate can be detected by means of the steering rate sensor 63, the steering angle of the rear wheels 2R and 2L may be controlled in such a manner that the steering angle of the rear wheels 2R and 2L increases in the same direction as the steered direction of the front wheels 1R and 1L in accordance with an increase of the rate of the steeting operation for the steering wheel.

The invention has thus been shown and described with reference to specific embodiments, however, it should be noted that the invention is in no way limited to the details of the illustrated arrangement but changes and modifications can be made without departing from the scope of the appended claims.

We claim:

1. In a steering mechanism for a vehicle including front wheel steering means for steering front wheels of the vehicle, operating means for effecting a steering movement of said front wheel steering means to a desired angle, and rear wheel steering means for steering rear wheels of said vehicle, steering angle control means for effecting a steering movement of said rear wheel steering means in relation to the steering movement of the front wheels, said steering angle control means including actuating means for moving said rear wheels to a desired steering angle of the rear wheels, the improvement comprising steering rate detecting means for detecting a rate of the steering operation for said operating means and producing signals denoting the rate of the steering operation, and steering ratio changing means for changing a steering angle of the rear wheels based on the signals from the steering rate detecting means in such a manner that a steering angle ratio of the steered angle of said rear wheels to the steered angle of said front wheel increases as the rate of the steering operation increases.

2. In a steering mechanism in accordance with claim 1 wherein the steering angle control means further comprises steering angle ratio setting means for determining a desired steering angle ratio of the rear wheels.

3. In a steering mechanism in accordance with claim 1 wherein said rear wheel steering means is mechanically connected to said front wheel steering means to obtain the desirable steering movement of the rear wheels in relation to the front wheels.

4. In a steering mechanism in accordance with claim 1 wherein said rear wheel steering means is electrically connected to said front wheel steering means to obtain the desirable steering movement of the rear wheels in relation to the front wheels.

5. In a steering mechanism in accordance with claim 3 wherein said rear wheel steering means includes intermediate rod means connected to the front wheel steering means for transmitting a rotative movement of the steering wheel to actuating arm means adapted to swing in accordance with the rotative movement of the intermediate rod means from the front wheel steering means, moving rod means for driving the rear wheels through gear means and rod means, connecting rod means connected to the moving rod means with a certain angle for being swung by the actuating means to thereby move the moving rod means in the axial direction of the moving rod, swingable arm means connected to the connected rod means at the end portion, actuating gear means for rotating the swingable arm means in accordance with an output of motor means which produce signals in response to the rate of the steering operation, the swingable arm means being disposed at a substantially right angle to the moving rod means so that the amount of the axial movement of the moving rod means can be compensated in accordance with the rotation of the swingable arm so as to obtain the desirable steering movement of the rear wheels.

* * * * *